United States Patent

Kanome et al.

[11] Patent Number: 5,433,897
[45] Date of Patent: Jul. 18, 1995

[54] METHOD AND APPARATUS FOR PREPARING SUBSTRATE SHEET FOR OPTICAL RECORDING MEDIUM

[75] Inventors: Osamu Kanome; Hirofumi Kamitakahara; Naoki Kushida, all of Yokohama; Hitoshi Yoshino, Zama; Toshiya Yuasa, Kawasaki; Takashi Kai, Hadano, all of Japan

[73] Assignee: Canon Kabushiki Kaisha, Tokyo, Japan

[21] Appl. No.: 77,114

[22] Filed: Jun. 16, 1993

[30] Foreign Application Priority Data

Jun. 19, 1992 [JP] Japan .................... 4-161343

[51] Int. Cl.6 .............. B29D 11/00; B29C 47/92
[52] U.S. Cl. .................. 264/1.33; 264/1.6; 264/40.6; 264/106; 264/167; 264/210.2; 264/284; 425/143; 425/327; 425/367; 425/810
[58] Field of Search .............. 264/1.3, 167, 106, 107, 264/40.6, 40.7, 210.2, 1.33, 1.6, 284; 425/143, 363, 367, 810, 327

[56] References Cited

U.S. PATENT DOCUMENTS

| | | | |
|---|---|---|---|
| 1,466,733 | 9/1923 | Sulzer et al. | |
| 3,751,550 | 8/1973 | Nauta | 264/275 |
| 3,756,760 | 9/1973 | McBride | 425/363 |
| 3,839,514 | 10/1974 | Nauta | |
| 4,556,378 | 12/1985 | Nyfeler et al. | 425/143 |
| 4,790,893 | 12/1988 | Watkins | 156/232 |
| 4,836,874 | 6/1989 | Foster | 156/209 |
| 4,965,118 | 10/1990 | Kodera et al. | 428/137 |
| 4,968,370 | 11/1990 | Watkins | 156/232 |
| 5,048,745 | 9/1991 | Sato et al. | 264/107 |
| 5,075,060 | 12/1991 | Imataki | 264/106 |
| 5,137,661 | 8/1992 | Kanome et al. | 264/1.3 |
| 5,147,592 | 9/1992 | Sato et al. | 264/167 |
| 5,158,724 | 10/1992 | Yagi et al. | 264/40.1 |
| 5,262,101 | 11/1993 | Yagi et al. | 425/143 |

FOREIGN PATENT DOCUMENTS

| | | |
|---|---|---|
| 369780A2 | 5/1990 | European Pat. Off. |
| 369780A3 | 5/1990 | European Pat. Off. |
| 369781A3 | 5/1990 | European Pat. Off. |
| 369781A2 | 5/1990 | European Pat. Off. |
| 387037A3 | 9/1990 | European Pat. Off. |
| 387037A2 | 9/1990 | European Pat. Off. |
| 478372 | 4/1992 | European Pat. Off. |
| 2-251422 | 10/1990 | Japan ........ 264/167 |
| 2-251423 | 10/1990 | Japan ........ 264/167 |

Primary Examiner—Mathieu D. Vargot
Attorney, Agent, or Firm—Fitzpatrick, Cella, Harper & Scinto

[57] ABSTRACT

A method for preparing a substrate sheet for an optical recording medium has the steps of controlling a roll stamper having a preformat pattern on the peripheral surface thereof and a molding roll disposed with a predetermined gap between the same and the roll stamper so that they have a predetermined temperature, feeding a thermoplastic resin heated to a predetermined temperature to the gap from a means for extruding the thermoplastic resin disposed on the upstream side of the gap, while the roll stamper and the molding roll are rotated at a predetermined rotational frequency, and then molding the thermoplastic resin into a sheet by pressing the resin between the roll stamper and the molding roll to transfer the preformat pattern to the resin. The method is characterized in that the molding is carried out under molding conditions regulated so that continuously measured gap temperatures of the substrate sheet may periodically fluctuate in a predetermined amplitude and so that the amplitude may accord with a previously set value of an amplitude corresponding to a desired transfer precision and birefringence value of the substrate sheet for the optical recording medium.

25 Claims, 5 Drawing Sheets

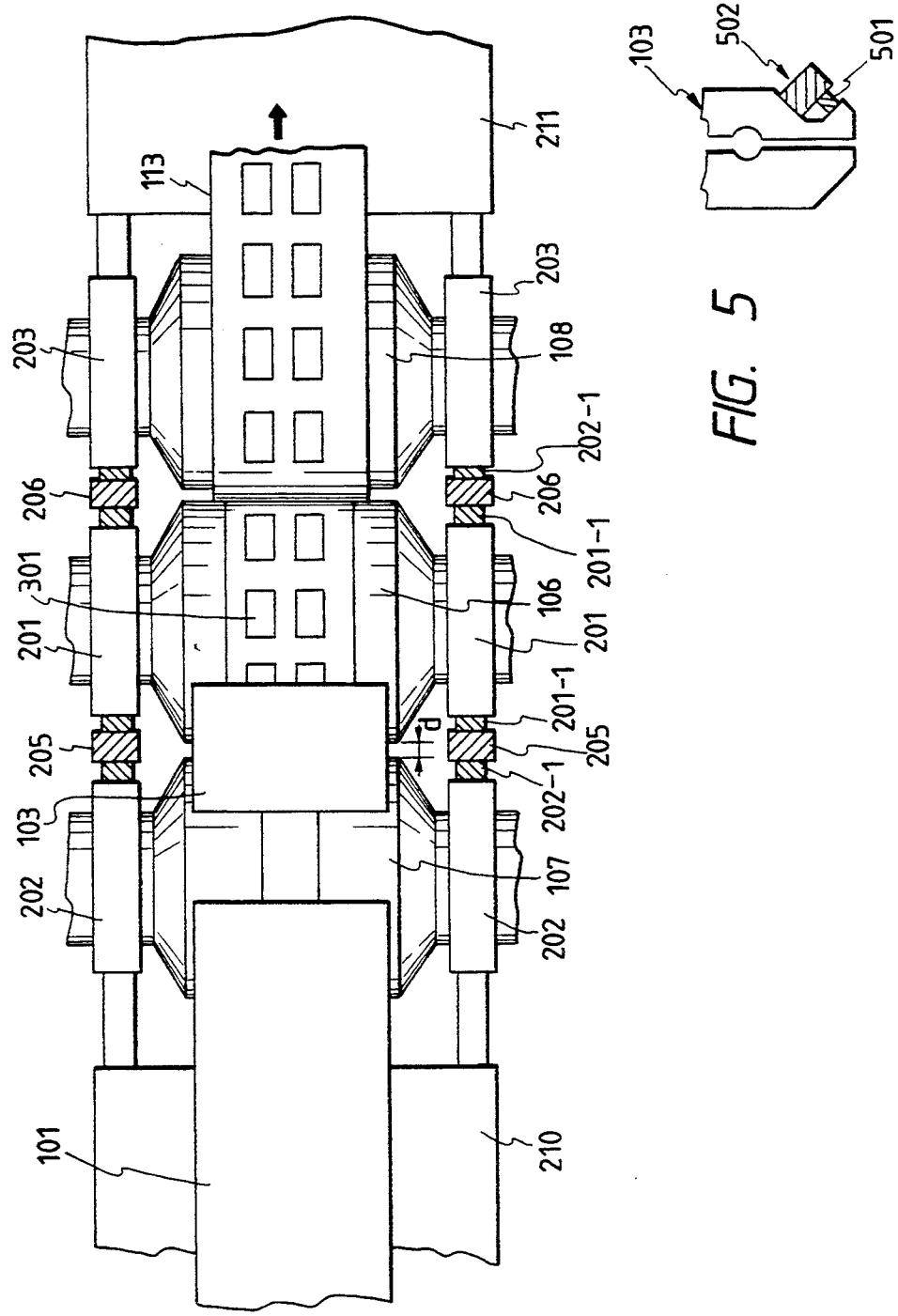

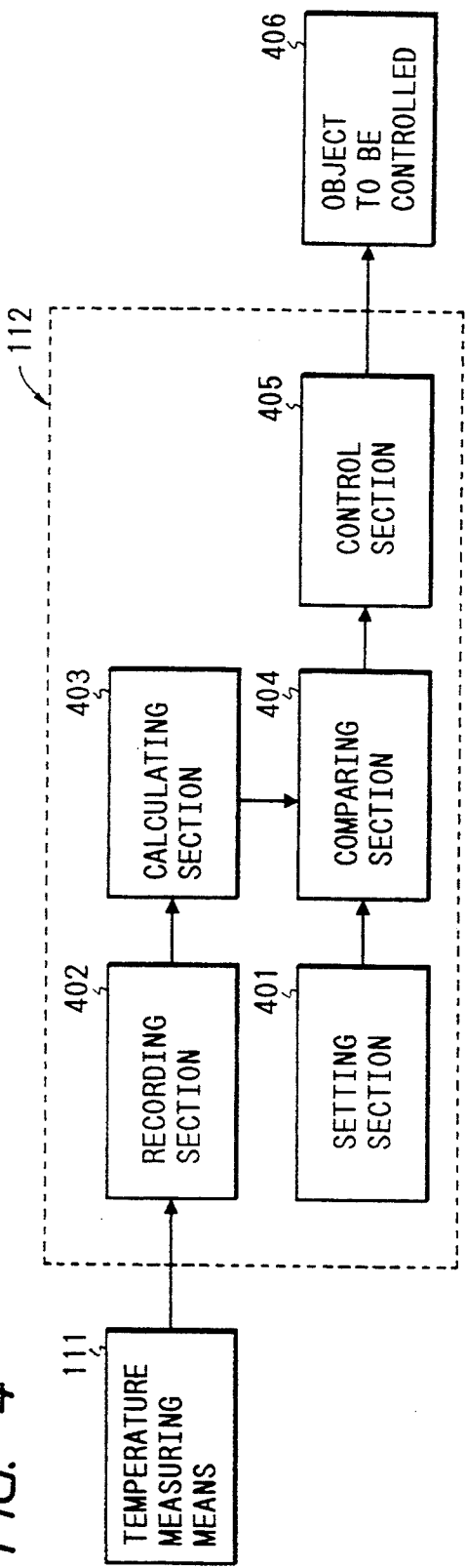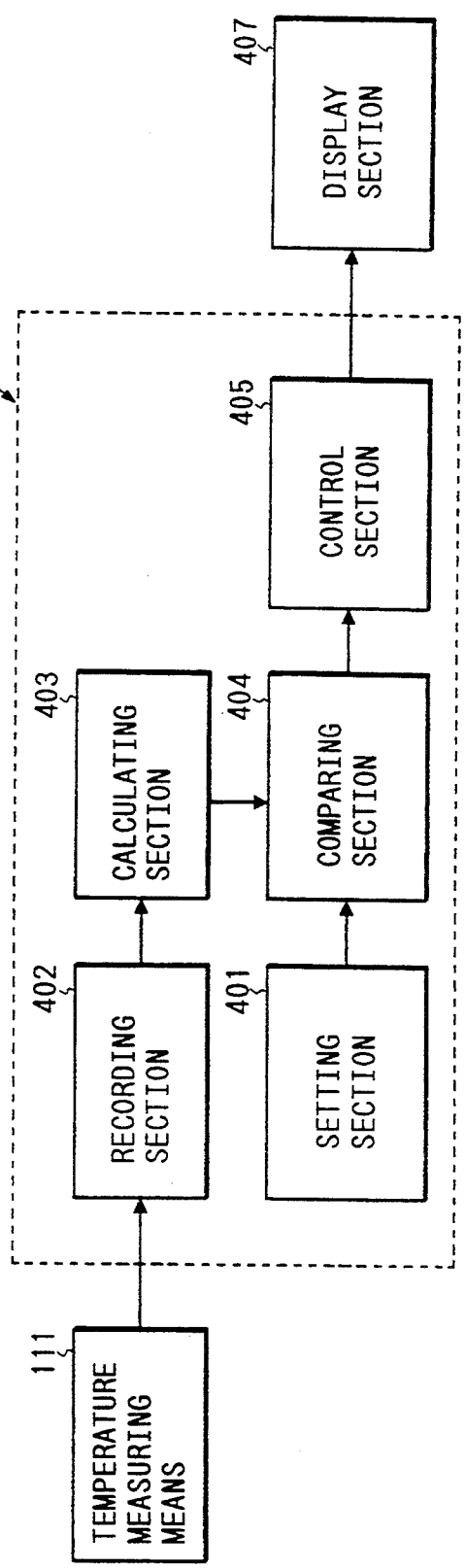

METHOD AND APPARATUS FOR PREPARING SUBSTRATE SHEET FOR OPTICAL RECORDING MEDIUM

BACKGROUND OF THE INVENTION

1. Field of the Invention

The present invention relates to an improved method and apparatus for preparing a substrate sheet for optical recording media such as optical discs and optical cards by continuously transferring a preformat pattern onto the surface of a resin sheet.

2. Related Background Art

In order to prepare substrates for optical recording media such as optical discs and optical cards which have a concave and/or a convex information structure (hereinafter referred to as "preformat") on their surfaces, a method using an extrusion molding technique has been investigated in recent years. That is, this method comprises pressing a roll stamper having a pattern (hereinafter referred to as "preformat pattern") corresponding to the preformat on its peripheral surface against the surface of a molten resin sheet extruded from an extruder to continuously transfer the preformat pattern to the resin surface, whereby the mass productivity of the substrates for the optical recording media can be remarkably improved. Therefore, much attention is paid to this method.

However, in the case that the substrates for the optical recording media are prepared, it must solve two technical problems, i.e., the improvement of a transfer precision of the preformat pattern and the reduction of a birefringence of the substrates irrespective of a molding method.

In the method of molding the substrates for the optical recording media by the use of the extrusion molding, it is known that molding conditions such as a roll temperature, a gap between the roll stamper and the surface of a molding roll, and an extrusion rate of the resin from a die have a large influence on the transfer precision of the preformat pattern and the birefringence of the substrates. For the purpose of solving this problem, the present inventors have suggested, in EP 478372, the employment of a roll stamper in which a heat insulating layer is interposed between the peripheral surface of a roll base and a stamper so as to obtain the high-quality substrates even under the fluctuation of molding conditions. This suggested method is extremely effective, since it can provide the high-quality substrates even when the molding conditions slightly fluctuate. However, in order to stably achieve the further improvement of the transfer precision of the preformat pattern to the substrates and the further reduction of the birefringence of the substrates, it is necessary to positively control the molding conditions.

However, the control of the molding conditions for stably achieving the improvement of the transfer precision of the preformat pattern to the substrates and the reduction of the birefringence of the substrates has depended largely upon the experience of an operator so far, and therefore it is difficult to stably manufacture the substrates for the optical recording media having a higher quality.

SUMMARY OF THE INVENTION

The present invention has been made in view of the above-mentioned problems, and an object of the present invention is to provide a method and an apparatus for molding a substrate sheet for optical recording media by the use of extrusion molding which permit stably achieving the further improvement of a transfer precision of a preformat pattern and the further reduction of a birefringence of the substrates.

The present inventors have conducted various investigations to accomplish the above-mentioned object, and as a result, they have discovered the following facts. When an extruded thermoplastic resin is passed through a gap between the peripheral surface of a molding roll and that of a roll stamper to mold a substrate sheet and temperatures (gap temperatures) of the resin are continuously measured immediately after the molding, it is apparent that the measured values periodically change in a certain range (FIG. 9), and when the gap between the peripheral surface of the molding roll and that of the roll stamper change, the extrusion rate of the thermoplastic resin from the T-die and a molding velocity (a rotary speed of the rolls) are changed, and the deflection range (an amplitude) of the measured values alters. Particularly, the increase of the gap between the peripheral surface of the molding roll and that of the roll stamper, the decrease of the extrusion rate of the thermoplastic resin from the T-die and the acceleration of the molding velocity enlarge the amplitude of the measured values and reduce the transfer precision of the preformat pattern. On the other hand, the decrease of the gap between the peripheral surface of the molding roll and that of the roll stamper, the increase of the extrusion rate of the thermoplastic resin and the slow-down of the molding velocity contract the amplitude of the measured values and increase the birefringence of the molded substrate sheet for the optical recording media. In short, the present inventors have found that the amplitude of the measured values is directly concerned with the transfer precision of the preformat pattern to the substrate sheet and the birefringence value of the substrate sheet, and thus the present invention has now been attained.

A method for preparing a substrate sheet for an optical recording medium of the present invention comprises the steps of controlling a roll stamper having a preformat pattern on the peripheral surface thereof and a molding roll disposed with a predetermined gap between the same and the roll stamper so that they have a predetermined temperature; feeding a thermoplastic resin heated to a predetermined temperature to the gap from a means for extruding the thermoplastic resin disposed on the upstream side of the gap, while the roll stamper and the molding roll are rotated at a predetermined rotational frequency; and then molding the thermoplastic resin into a sheet by pressing the resin between the roll stamper and the molding roll to transfer the preformat pattern to the resin, said method being characterized in that the molding is carried out under molding conditions regulated so that continuously measured gap temperatures of the substrate sheet may periodically fluctuate in a predetermined amplitude and so that the amplitude may accord with a previously set value of an amplitude corresponding to a desired transfer precision and birefringence value of the substrate sheet for the optical recording medium.

Another method for preparing a substrate sheet for an optical recording medium of the present invention comprises the steps of controlling a roll stamper having a preformat pattern on the peripheral surface thereof and a molding roll disposed with a predetermined gap between the same and the roll stamper so that they have a predetermined temperature; feeding a thermoplastic resin heated to a predetermined temperature to the gap from a means for extruding the thermoplastic resin disposed on the upstream side of the gap, while the roll stamper and the molding roll are rotated at a predetermined rotational frequency; and then molding the thermoplastic resin into a sheet by pressing the resin between the roll stamper and the molding roll to transfer the preformat pattern to the resin, said method being characterized by comprising a step of continuously measuring temperatures of the substrate sheet immediately after the passage of the gap, a step of calculating an amplitude of the fluctuation of the measured values of the temperatures in a predetermined time, and a step of controlling molding conditions so that the amplitude may accord with a previously set value of an amplitude corresponding to a desired transfer precision and a birefringence of the substrate sheet for the optical recording medium.

An apparatus for preparing a substrate sheet for an optical recording medium of the present invention comprises a means for extruding a thermoplastic resin; a roll stamper which has a preformat pattern on the peripheral surface thereof and which is controllable to have a predetermined temperature and rotatable at a predetermined rotational frequency; and a molding roll for pressing the extruded resin together with the roll stamper to transfer the preformat pattern on the surface of the roll stamper to the resin and to mold the substrate sheet for the optical recording medium, the molding roll being disposed so as to confront the roll stamper with a predetermined gap between the same and the roll stamper, being controllable to have a predetermined surface temperature, and being rotatable at a predetermined rotational frequency; said apparatus being characterized by being provided with a measuring means capable of continuously measuring temperatures of the substrate sheet immediately after the substrate sheet has passed through the gap, and a control means having the following sections a calculating section for calculating an amplitude of the fluctuation of measured values of the temperatures in a predetermined time, a setting section for previously setting an amplitude value corresponding to a desired transfer precision and birefringence of the substrate sheet for the optical recording medium, a comparing section for comparing the amplitude obtained in the calculating section with the value set in the setting section to calculate a deviation, and a controlling section for controlling several molding conditions in accordance with the degree of the deviation obtained in the comparing section so as to eliminate the deviation.

As described above, the gap temperature of the substrate sheet periodically fluctuates and the size of its amplitude can be utilized as standards of the transfer precision of the preformat pattern to the substrate sheet and the birefringence value of the substrate sheet, but the reason for this is not apparent. Nevertheless, the following reason can be considered from some phenomena. In the first place, the periodic fluctuation of the gap temperatures indicates that a contact state of the roll stamper and the molding roll with the thermoplastic resin periodically changes. Furthermore, in the case that the substrate sheet having a predetermined thickness is prepared by extrusion molding, the molding conditions are usually set so as to be always constant. Thus, the change of the contact state is considered to be due to an unintended fine fluctuation of the molding conditions which is caused by, for example, the turbulence of a roundness of the roll in a region in excess of the limit of the finishing accuracy of the roll stamper and the molding roll as well as the shift of a rotary axis. The decrease of the amplitude of the gap temperatures is due to such a condition that the contact state between the resin and each of the roll stamper and the molding roll in the gap does not change even by the above-mentioned random fluctuation of the molding conditions. It can be considered that the above-mentioned condition is produced by applying a large pressure of the roll stamper and the molding roll to the resin present in the gap, judging from the phenomenon that the decrease of the amplitude leads to the increase of the birefringence of the substrate as described above. That is, from this conception, it can be considered that the degree of the amplitude of the gap temperatures indirectly indicates the pressure against the resin present in the gap, and therefore the degree of the amplitude can be utilized as the standards of the transfer precision and the birefringence value of the substrate sheet.

BRIEF DESCRIPTION OF THE DRAWINGS

FIG. 3 is a schematic plan view of the apparatus for preparing the substrate sheet for the optical recording medium shown in FIG. 1.

FIG. 4 is a control block diagram of a control means of the apparatus for preparing the substrate sheet for the optical recording medium of the present invention.

FIG. 5 is a schematic sectional view showing another constitution of a die which can be used in the present invention.

FIG. 7 is a control block diagram regarding another embodiment of the control means of the apparatus for preparing the substrate sheet for the optical recording medium of the present invention.

DETAILED DESCRIPTION OF PREFERRED EMBODIMENTS

Now, the present invention will be described in detail in reference to drawings.

Figure 1:
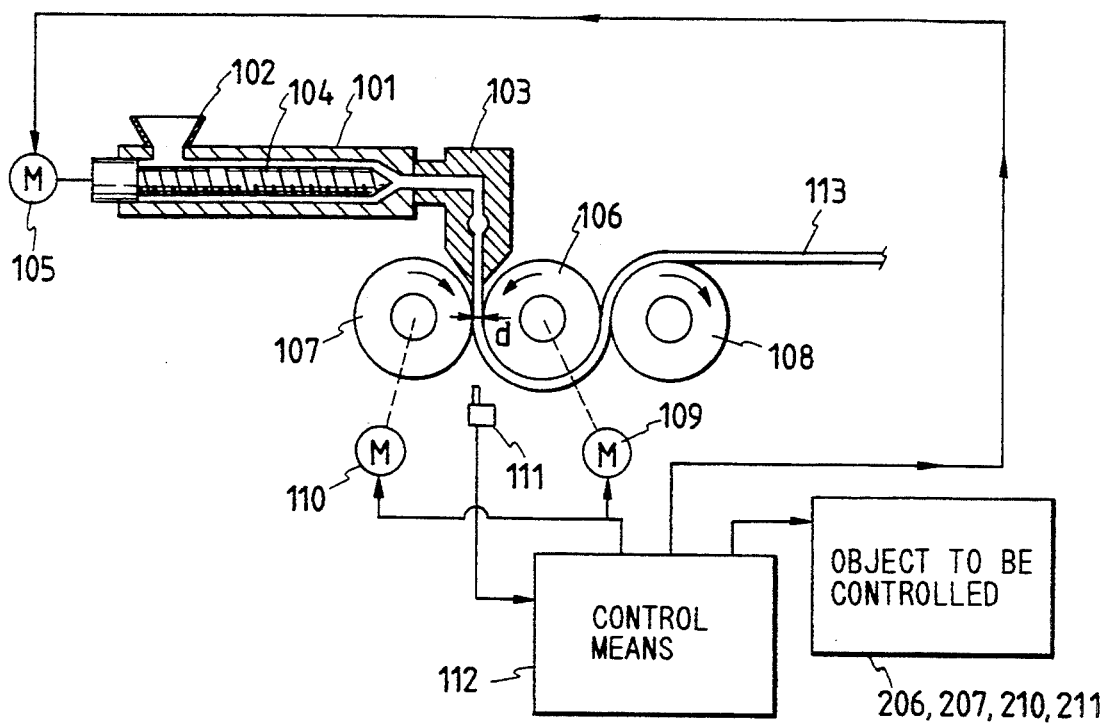
FIG. 1 is a schematic sectional view of one embodiment of an apparatus for preparing a substrate sheet for an optical recording medium of the present invention.
Figure 2:
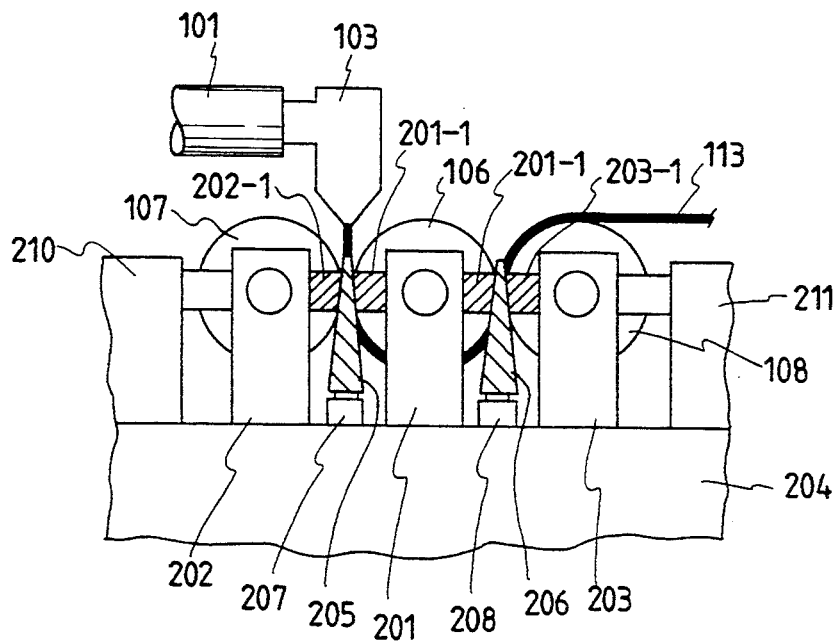
FIG. 2 is a schematic side view of the apparatus for preparing the substrate sheet for the optical recording medium shown in FIG. 1.

FIG. 1 is a constitutional view of an apparatus for molding a substrate sheet for an optical recording medium regarding the present invention, and FIG. 2 is a schematic side view of the apparatus shown in FIG. 1. Furthermore, FIG. 3 is a schematic plan view of the apparatus shown in FIG. 2.

In FIG. 1, reference numeral 101 is an extruder for melting the pellets of a thermoplastic resin fed through a hopper 102, and numeral 103 is a die for shaping, into the form of a sheet, the resin which has been molten in the extruder 101 and then pressed by a screw 104 in the extruder. Numeral 105 is a motor for rotating the screw 104 at a predetermined rotational frequency.

Next, reference numeral 106 is a roll stamper equipped with a preformat pattern 301, and numerals 107, 108 are molding rolls disposed so as to confront the roll stamper. The roll stamper 106 and the molding roll 107 are arranged in order to have a gap d between the peripheral surfaces of these members 106, 107. The die 103 is arranged so as to feed the sheet-like resin in a plastic state to the gap from its upstream side. Incidentally, the term "gap" simply referred to in this specification means a gap between the roll stamper 106 and the molding roll 107. The roll stamper 106 and the molding rolls 107 and 108 are rotatably supported on bearings 201–203, shown in FIG. 2, and these bearings are mounted on a base 204 so that they may be independently movable in right and left directions. Furthermore, these rolls are constituted so that a heating fluid may be circulated therein for the purpose of adjusting the surface temperatures of the rolls to predetermined temperatures. In addition, these rolls are also constituted so as to be rotatable at a predetermined velocity in directions shown in FIG. 1 by driving motors 109, 110, as shown in the same drawing.

The bearings 201–203 are provided with taper blocks 201-1, 202-1 and 203-1, as shown in FIG. 2 or 3, and wedge-like gap regulating members 205, 206 are fixedly arranged on the base 204 via lifting devices 207, 208 between the bearings 201 and 202 and between the bearings 201 and 203, respectively. The wedge-like members 205, 206 are shaped into such a form as to be capable of coming in contact with the tapered surfaces of the taper blocks, and the bearings are constituted so as to be mutually pressed by pressing devices 210, 211 fixed on the base. The gap between the roll stamper 106 and the molding roll 107 and the gap between the roll stamper 106 and the molding roll 108 can be regulated by controlling a pressure to be applied to the respective bearings by the pressing devices 210, 211. Moreover, the gap between the roll stamper 106 and the molding roll 107 and the gap between the roll stamper 106 and the molding roll 108 can be controlled by upward or downward moving the wedge-like members 205, 206 to the base 204 by the lifting devices 207, 208.

As shown in FIG. 1, a temperature measuring means 111 is disposed vertically under the gap. This temperature measuring means 111 is used to measure temperatures of the thermoplastic resin immediately after it has been molded into a substrate sheet 113 for an optical recording medium by passing the resin through the gap between the roll stamper 106 and the molding roll 107. The temperature measuring means is preferably a means which can precisely measure a cooling state of the resin at a time when the thermoplastic resin passed through the gap is pressed between the roll stamper 106 and the molding roll 107. As such a means, there can be suitably used, for example, a non-contact thermometer, typically, an infrared radiating thermometer or the like.

In the present invention, the temperature measuring means 111 is constituted so as to continuously measure the temperatures of the substrate sheet immediately after the sheet has been passed through the gap and so as to input the thus measured values, i.e., the data to the undermentioned control means 112. In this connection, in the present invention, the "continuous" measurement of the temperatures of the substrate sheet also include a case where the measurement is made intermittently at such intervals as to permit detecting a fluctuation of the gap temperatures of the substrate sheet in a predetermined time.

Next, the control means 112 regarding the embodiment of the present invention will be described in reference to FIGS. 1 and 4. As shown in FIG. 4, the control means 112 is composed of a setting section 401, a recording section 402, a calculating section 403, a comparing section 404 and a control section 405.

The setting section 401 sets an amplitude value corresponding to the transfer precision and the birefringence value of the substrate sheet as desired values or in an allowable range which are given by preliminary molding or the like.

The recording section 402 takes in and memorizes the values of the gap temperatures of the substrate sheet continuously measured by the temperature measuring means 111.

The calculating section 403 calculates an amplitude of the gap temperatures in a predetermined time from the temperature information memorized in the recording section 402.

The comparing section 404 compares the amplitude calculated in the calculating section 403 with the amplitude set in the setting section 401 to determine a deviation.

Next, the control section 405 controls an object 406 for regulating molding conditions in such a direction as to reduce the deviation, if any, on the basis of the deviation calculated in the comparing section 404. Examples of the object to be controlled include the lifting devices 207, 208 and the pressing devices 210, 211 for regulating the gap size between the roll stamper 106 and the molding roll 107; the driving motors 109, 110 for the roll stamper 106 and the molding roll 107 for regulating the molding velocity; and the driving motor 105 for the screw 104 in the extruder 101 for regulating the feed rate of the resin to the gap, as shown in FIG. 1. Alternatively, as shown in FIG. 5, a lip regulating device 502 which is disposed at the tip of the die 103 can be utilized, and this lip regulating device 502 can control the width of a die lip which is an outlet of the resin by adjusting a screwed quantity of a die lip screw 501. The feed of the resin to the gap may be regulated by controlling the screwed quantity of the die lip screw 501, or may be done by using both of the control of the rotational frequency of the screw 104 and that of the die lip screw 501.

It is not always necessary that all of the molding conditions are made controllable, so long as the above-mentioned three molding conditions which can be controlled by the control section can be regulated so that the deviation may be zero, but it is preferable to make two or more of the molding conditions controllable. That is, for example, the control of the gap size has an influence on the thickness of the substrate sheet, and therefore the gap size is preferably controlled in a range in which the fluctuation of the thickness of the substrate sheet is allowed, typically in a range of ±10%, preferably ±5% of the predetermined sheet thickness. In such a control range, even when the deviation cannot be reduced, if the other molding conditions are made controllable, the elimination of the deviation can be achieved by controlling the latter molding conditions.

Similarly, with regard to the rotary speed, i.e., the molding velocity of the roll stamper and the molding rolls, its control range is preferably limited to 0.3 to 10 m/min, preferably 0.5 to 5 m/min, more preferably 1 to 4 m/min in consideration of the transfer precision of the preformat pattern. Even if the deviation cannot be eliminated in this range, if the other molding conditions are made controllable, the deviation can be eliminated by controlling the latter molding conditions.

Next, reference will be made to a method for molding the substrate sheet by the use of the above-mentioned molding apparatus of the substrate sheet.

In the first place, the pellets of the thermoplastic resin are fed to the extruder 101 through the hopper 102 and then molten in the extruder 101, and the molten resin is pressed by rotating the screw 104 with the motor 105 to forward the resin to the die 103. Through this die 103, a sheet-like molten resin is discharged. The molten resin discharged through the die 103 is fed to the gap defined by the roll stamper 106 and the molding roll 107. The resin fed to the gap is carried by the rotation of the roll stamper 106 and the molding roll 107, while pressed between the roll stamper 106 and the molding roll 107 to transfer the preformat pattern to the resin and to mold the resin into the sheet having a predetermined thickness, and the molded substrate sheet 113 is then sent out through the gap.

In the molding method, the gap temperatures of the substrate sheet are continuously measured by the temperature measuring means 111 disposed on the downstream side of the gap, and the thus measured values, i.e., the data are input to the recording section 402 of the control means 112 and then memorized therein. Afterward, an amplitude of the gap temperatures of the substrate sheet in a predetermined time is calculated from the data held in the recording section 402 by the calculating section 403. Here, the term "predetermined time" is a time of one cycle or more of the periodic fluctuation of the certain amplitude which the gap temperatures indicate. In the present invention, it is extremely effective for molding the high-quality substrate sheet to set this predetermined time to a time required for one rotation of the roll stamper, and this is a preferable embodiment.

Next, the value of the amplitude calculated in the calculating section 403 is transmitted to the comparing section 404, and in the comparing section 404, the value of the amplitude is compared with a previously given amplitude value corresponding to the desired transfer precision and birefringence value of the substrate sheet to determine a deviation. Then, on the basis of this deviation, the molding conditions are controlled in order to eliminate the deviation in the control section, thereby obtaining the substrate sheet having the desired transfer precision and birefringence value.

In the above-mentioned molding method, the set values to be input to the setting section 401 can be selected as follows. For example, preliminary molding is carried out, and the amplitude value which permits obtaining the substrate sheet having the desired transfer precision and birefringence value is selected on the basis of the correlation of the gap temperatures of the substrate sheet obtained in the molding process and the transfer precision of the preformat pattern to the substrate sheet and the birefringence value of the substrate sheet. Concretely, for example, the amplitude value is selected which permits the preparation of the substrate sheet having a transfer precision of 90% or more, preferably 95% or more, more preferably 98% or more, and a birefringence value of 20 nm or less, preferably 15 nm or less, more preferably 10 nm or less in the case of single passage. When the amplitude which can provide the substrate sheet having the excellent properties is present in the form of a range, the set values may be regarded as the range.

Typical examples of the set values are as follows. For example, in the case that the polycarbonate substrate sheet having a thickness of 0.4 mm is molded at a sheet feed rate of 3 to 5 m/min by the use of the apparatus shown in FIG. 1 and the roll stamper having a peripheral surface on which the pattern is directly formed is used, the amplitude in a time required for one rotation of the roll stamper is set to 2° to 20° C., preferably 2° to 10° C., more preferably 3° to 5° C., whereby the high-quality substrate sheet can be molded.

Furthermore, for example, in the case of using the roll stamper having a peripheral surface fixedly provided with a flexible stamper via a heat insulating layer which is disclosed in the above-mentioned EP 478372 filed by the applicant of the present application, the amplitude in a time required for one rotation of the roll stamper is set to 1° to 25° C., preferably 2° to 20° C., more preferably 4° to 15° C., whereby the high-quality substrate sheet can be molded.

The above-mentioned set values can also be applied to a case where a thermoplastic material other than the polycarbonate, for example, an amorphous polyolefin is used.

In the above-mentioned molding process of the present invention, with regard to the control of the molding conditions which is carried out in the control section on the basis of the deviation calculated in the comparing section, for example, in the case that the deviation shifts to the plus (+) side of the set values, this means that the pressure of the roll stamper and the molding rolls to the resin in the gap is insufficient. Therefore, it is preferable to carry out at least one of the control of decreasing the gap size (d), the control of increasing the feed rate of the resin to the gap, and the control of lowering the rotary speed of the roll stamper and the molding rolls.

Furthermore, in the case that the deviation shifts to the minus (−) side of the set values, this means that the pressure of the roll stamper and the molding rolls to the resin in the gap is too high. Therefore, it is preferable to carry out at least one of the control of increasing the gap size (d), the control of decreasing the feed rate of the resin to the gap, and the control of increasing the rotary speed of the roll stamper and the molding rolls.

Figure 6:
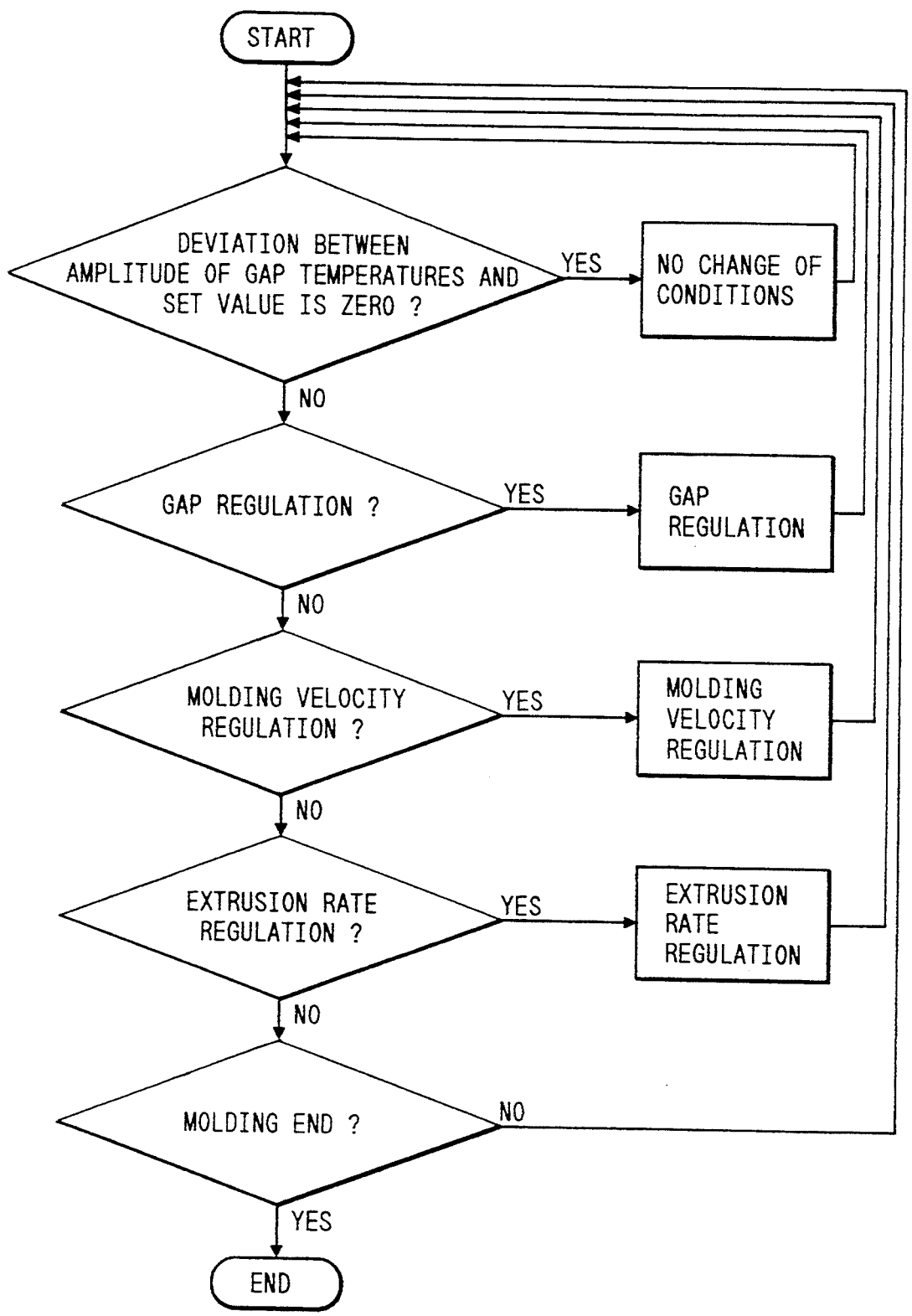
FIG. 6 is a flow chart showing a control procedure of molding conditions in a method for preparing the substrate sheet for the optical recording medium of the present invention.
Figure 8:
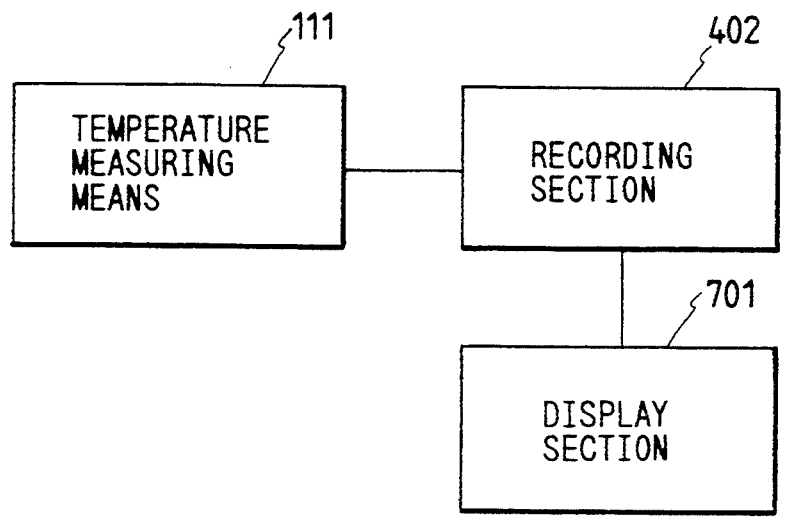
FIG. 8 is a control block diagram regarding still another embodiment of the control means of the apparatus for preparing the substrate sheet for the optical recording medium of the present invention.
Figure 9:
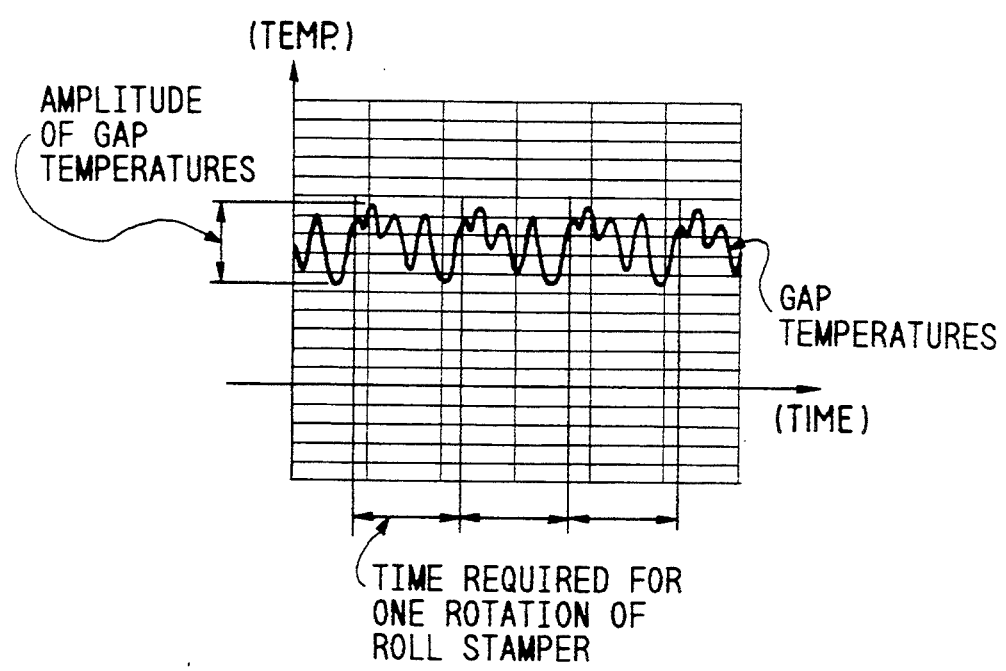
FIG. 9 is an illustrative view of periodic fluctuation having a constant amplitude which indicates gap temperatures of the substrate sheet for the optical recording medium.

As described above, it is preferable to carry out at least two of the above-mentioned three control operations, but no particular restriction is put on the order of the plural control operations. However, as in FIG. 6 showing a flow chart, it is preferable to carry out the control operations in the order of (1) the control of the gap, (2) the control of the rotary speed (the molding velocity) of the roll stamper and the molding rolls, and (3) the control of the feed rate of the resin to the gap. That is, with regard to the relative degree of an influence on the gap temperatures of the substrate sheet, the factor (1) of the above-mentioned conditions is largest and the factor (3) is smallest. Accordingly, it is effective for the prompt elimination of the deviation to do the control in the order of the conditions (1), (2) and (3).

In FIG. 6, the nonperformance of the control operations in the block of the gap control or the block of the molding velocity control is selected in the case that, for example, the deviation cannot be eliminated by carrying out the gap control or the molding velocity control in the allowable range of the above-mentioned conditions.

In the molding process of the substrate sheet 113 of the present invention, it is preferable that the melting resin extruded from the die 103 is pressed by and between the roll stamper 106 and the molding roll 107, while the resin is as close as possible to a molten state. Thus, it is preferable that the temperature of the die 103 is as high as possible in a range in which the resin does not decompose, and so the die temperature is preferably in the range of from [a glass transition temperature (hereinafter abbreviated to "Tg") of the molded resin]+110° C. to Tg+200° C., more preferably from Tg+130° C. to Tg+190° C. For example, in the case of the polycarbonate resin, the die temperature is preferably in the range of from 260° to 340° C., more preferably from 280° to 330° C., most preferably from 290° to 320° C.

If the molten resin extruded from the die 103 is cooled in a space between the die 103 and the gap, the preformat pattern cannot be transferred sufficiently and the birefringence tends to occur. Therefore, the distance from the die 103 to the gap is preferably 20 cm or less, more preferably 15 cm or less, most preferably 10 cm or less. Furthermore, the temperature of the space between the die and the gap is preferably 60° C. or more.

In order to precisely extrude the resin sheet to a pressing point, it is preferable to take such a constitution of vertical extrusion as shown in FIG. 1 in which the pressing point is present on a line extending vertically under the T-die.

According to this constitution, the resin can be more precisely extruded to the pressing point than by horizontal extrusion, because the resin is close to the molten state.

Surface temperatures of the roll stamper 106 and the molding rolls 107, 108 depend upon a resin to be used. For example, in the case that the polycarbonate is used, the temperature of the roll stamper 106 is set to 110° to 145° C. in consideration of a heat deformation temperature of the polycarbonate, and temperatures of the molding rolls 107 and 108 are set to 90° to 135° C. and 120° to 150° C., respectively. In the case that the amorphous polyolefin is used, the temperature of the roll stamper 106 is set to 120° to 145° C., and temperatures of the molding rolls 107 and 108 are set to 100° to 135° C. and 120° to 150° C., respectively. The temperatures of these rolls can be controlled by heating them with a heater embedded in the rolls or by circulating a heating medium through their central portions.

The resin which can be used as the material of the substrate sheet 113 in the present invention is a thermoplastic resin which preferably has a high permeability to light for recording and reproduction. Examples of the thermoplastic resin include an acrylic resin, polyester resin, polycarbonate resin, vinyl resin, polysulfone resin, polyolefin resin and cellulose derivatives.

The materials of the molding rolls 107, 108 and the roll stamper 106 in the present invention are preferably those which have high hardness and excellent thermal conductivity and which allow easily achieving mirror finish on the peripheral surfaces thereof. Preferable examples of these materials include steel, chromium steel, aluminum and steel for molds (maraging steel).

The thus obtained substrate sheet 113 for the optical recording medium is wound up and then forwarded to the next process for forming a recording layer and/or a reflective layer, a protective layer, or a hard coat layer on an incident surface of light for recording and/or reproducing the substrate sheet 113 for the optical recording medium. Alternatively, after the molding of the substrate sheet 113 for the optical recording medium, the above-mentioned processes may be continuously carried out.

As materials for the recording layer which is formed on the preformat-transferred surface of the substrate sheet for the optical recording medium, there can be used, for example, an oxide of Te, Sb, Mo, Ge, V or Sn; an inorganic compound of Sn or $TeO_x$-Ge; a composite of a metal and an organic compound or an inorganic sulfide such as Te-$CH_4$, Te-$CS_2$, Te-styrene, Sn-$SO_2$, GeS-Sn or SnS-S; a thermoplastic resin such as nitrocellulose, polystyrene or polyethylene in which particles of a metal such as silver are dispersed; a chalcogen element; a magnetic film of Tb-Fe-Co, Gd-Fe-Co, Tb-Fe-Co-Cr, Gd-Fe-Co-Cr or the like; and an organic dyestuff.

In the above-mentioned embodiment, the molding conditions are automatically controlled on the basis of the deviation between the amplitude of the gap temperatures of the substrate sheet in a predetermined time and the set values, but the control of the molding conditions on the basis of the deviation may be carried out by hand. In the concrete, for example, a display means 407 may be provided which lets an operator know the deviation quantity of the control section 405 in the control means 112, as shown in FIG. 7, or alternatively, a display means 407 may be provided which lets an operator know the amplitude of the recording section 402 for recording the measured values from the temperature measuring means 111, whereby the operator can regulate the molding conditions on the basis of the displayed results.

In the present invention, typical examples of the preformat pattern include a pattern corresponding to a tracking track for optical discs and optical cards which has a spiral shape or a concentric circle shape of 1 to 4 μm in width, 1 to 20 μm in pitch and 200 to 5000 Å in depth or height, and a pattern corresponding to address pits of 0.6 to 10 μm in width, 0.6 to 20 μm in length and 200 to 5000 Å in depth or height. In the present invention, the address pits contain convexes and/or concaves on the surface of the substrate for the optical recording medium.

As described above, the present invention is based on a novel knowledge that in the method for preparing the substrate sheet for the optical recording medium by the use of the extrusion molding, the amplitude of the gap temperatures of the substrate sheet in a predetermined time is closely connected with the characteristics of the substrate sheet, and according to the present invention, when the substrate sheet for the optical recording medium is prepared by the use of the extrusion molding, the molding conditions which permit obtaining the high-quality substrate sheet can be easily set by the use of the amplitude of the gap temperatures of the substrate sheet in a predetermined time without depending upon the experience of an operator, whereby the optimum molding conditions can be set in a short time. Furthermore, according to the present invention, the gap temperatures of the substrate sheet for the optical recording medium can be monitored, and the molding conditions can be controlled so that the amplitude of the measured values in the predetermined time may be present in the allowable range of set values, whereby the substrate sheet for the optical recording medium which is excellent in the transfer precision of a preformat pattern and which has a small birefringence can be molded stably for a long period of time.

EXAMPLES

Next, the present invention will be described in more detail in reference to examples.

Example 1

In the first place, a molding equipment shown in FIGS. 1 to 3 was prepared.

Concretely, an extruder 101 provided with a screw 104 having a diameter of 65 mm therein was prepared, and a die having a slit of 30 cm in length and 0.8 mm in width on the tip thereof through which a resin would be discharged was disposed so that the molten resin might be extruded in a vertical downward direction. Next, the peripheral surfaces of roll base members comprising chromium-plated steel were mirror-polished to a surface coarseness of 0.1 $\mu$m or less to form molding rolls 107 and 108 having a diameter of 31 cm and a width of 45 cm.

Furthermore, three nickel stampers of 18 cm in width, 30 cm in length and 100 $\mu$m in thickness which had a pattern corresponding to a preformat for optical cards were fixed on the peripheral surface of a roll base member comprising chromium-plated steel with a mirror-polished surface to manufacture a roll stamper having a diameter of 31 cm and a width of 45 cm. In this case, the above-mentioned pattern corresponding to a preformat for optical cards was a pattern corresponding to track grooves of 3 $\mu$m in width, 12 $\mu$m in pitch and 2500 Å in depth which were formed in a longer direction in a rectangle region of 30 mm in width and 85 mm in length.

The thus obtained roll stamper and molding rolls were mounted on bearings 201, 202 and 203, as shown in FIGS. 2 and 3, and the positions of the bearings and the positions of gap regulating members 205, 206 were regulated to set a gap between the roll stamper 106 and the molding roll 107 to 0.560 mm as initial conditions and to set a gap between the roll stamper 106 and the molding roll 108 to 0.40 mm which was the thickness of the substrate for optical cards.

Next, the position of the gap defined by the roll stamper 106 and the molding roll 107 was regulated and fixed by pressing devices 210, 211 so that the gap might be vertically under the die 103, and a radiating thermometer (trade name: IT 2-50; made by Keyence Co., Ltd.) capable of inputting data to a control means was arranged vertically under the gap, as shown in FIG. 1. The control section could control motors 105, 109, 110, lifting devices 207, 208 and the pressing devices 210, 211.

Next, a substrate sheet for an optical card having a thickness of 0.40 mm was preliminarily molded by the use of this equipment, and correlation of gap temperatures of the substrate sheet, the transfer precision of the preformat pattern and the birefringence of the substrate sheet was observed.

As a thermoplastic resin, a polycarbonate (trade name L-1250, made by TeiJin Chemical Limited) containing 0.05 wt. % of pentaerythritol tetrastearate as a releasing agent was used, and a die temperature was set to 300° C. and a surface temperature of the roll stamper 106 was set to 145° C. As initial molding conditions, a feed rate of the substrate sheet was set to 3.0 m/min, and a feed rate of the resin to the gap was set to 22 kg/hr. The molding conditions were controlled every 30 minutes to change an amplitude of temperature change of the gap temperatures of the substrate sheet during one rotation of the roll stamper 106 between 2° C. and 10° C. In this example, the size of the gap was controllable between 0.54 mm and 0.58 mm, and a molding velocity was controllable between 2.7 m/min and 3.3 m/min. Furthermore, an extrusion rate of the resin was controllable between 19.8 k/hr and 24.2 k/hr, and a distance from the die 103 to the gap was set to 10 cm. As a result, when the amplitude was in the range of from 3° to 6° C., the transfer precision of the preformat pattern was 95% or more and the birefringence was about 8 nm, and thus the substrate sheet for optical cards which was extremely excellent in quality and which substantially free from scatter could be obtained.

Here, an amplitude range of from 4.0° to 5.0° C. obtained by incorporating a margin into the above-mentioned amplitude range of from 3° to 6° C. was input as a set value to a setting section 401 in a control means 112, and the substrate sheet having a thickness of 0.4 mm for optical cards was molded for 5 hours, while the molding conditions were controlled so that the amplitude of the gap temperatures of the substrate sheet during one rotation of the roll stamper 106 might be always present in the range of the set values.

At this time, the actual control of the molding conditions was carried out as shown in Table 1.

That is, after 50 minutes had elapsed since the start of the molding, the amplitude of the gap temperatures rose 1° C. than the set value (hereinafter referred to as "the deviation was ±1° C."). Therefore, control was made so as to narrow the gap as much as 6 $\mu$m. Next, after 120 minutes had elapsed since the start of the molding, the amplitude was +1° C. Therefore, control was made again so as to narrow the gap as much as 7 $\mu$m.

After 150 minutes had elapsed since the start of the molding, the amplitude was −1° C. Therefore, control was made so as to widen the gap as much as 5 $\mu$m.

After 200 minutes had elapsed since the start of the molding, the amplitude was +2° C. Therefore, control was made again so as to narrow the gap as much as 12 $\mu$m.

After 240 minutes had elapsed since the start of the molding, the amplitude was −1° C. Therefore, control was made so as to widen the gap as much as 6 $\mu$m.

Thus, the above-mentioned control permitted regulating the deviation to zero.

TABLE 1

| Time after Molding Start | 50 min | 120 min | 150 min | 200 min | 240 min |
| --- | --- | --- | --- | --- | --- |
| Deviation of Gap Temperatures (°C.) | +1 | +1 | −1 | +2 | −1 |
| Control Quantity of Gap ($\mu$m) | −6 | −7 | +5 | −12 | +6 |
| Control Quantity of Resin Feed (kg/hr) | 0 | 0 | 0 | 0 | 0 |
| Control Quantity of Molding Velocity (m/min) | 0 | 0 | 0 | 0 | 0 |

For the thus obtained substrate sheet for optical cards, thickness, the transfer precision of the preformat pattern and the birefringence were measured.

As a result, the thickness of the substrate sheet was 0.36 to 0.44 mm which was in the allowable range determined by standards, and the transfer precision was 95% or more. In addition, the birefringence was 9 nm or less. Thus, the high-quality substrate for optical cards could be obtained.

In this example, the transfer precision was evaluated as follows. A sectional shape of the preformat pattern-transferred portion on the substrate sheet was observed at 15 positions in a direction vertical to the track groove by an electron radiation surface morphology analyzer (trade name ESA-3000; made by ERIONIX CO., LTD.) to measure a width a of a land in the track groove-transferred portion of the substrate sheet and a width A of a bottom in the concave portion of the track groove on the stamper, and the evaluation of the transfer precision was made by a value of a/A.

The birefringence was measured with light having a wavelength of 830 nm and a spot diameter of 1 μm by the use of a polarimeter (trade name SP-224 model; made by Shinko Seiki Co., Ltd.), and its evaluation was made by a value of single passage.

Comparative Example 1

The same procedure as in Example 1 was repeated except that a set value to be input to a setting section 401 in a control means 112 was controlled to 0° C., that is, molding conditions were controlled so that the gap temperatures of the substrate sheet might be not fluctuated, to prepare a substrate sheet for optical cards.

As a result, the thickness of the substrate sheet was in standards and a transfer precision was also good, 95% or more, but portions having birefringences of 30 nm or more were unevenly present. In consequence, the product was defective as a substrate sheet for optical cards.

Comparative Example 2

The same procedure as in Example 1 was repeated except that molding conditions were not controlled in the control section, to prepare a substrate sheet for optical cards.

As a result, the thickness of the substrate sheet was in standards and a birefringence was also within the range of from 8 nm to 15 nm, but a transfer precision was poor, about 75%. Consequently, the product was defective as a substrate sheet for optical cards.

Example 2

The peripheral surface of a roll base member comprising chromium-plated steel was mirror-polished to a surface coarseness of 0.1 μm or less, and the same three nickel stampers having a thickness of 100 μm as used in Example 1 were fixed on the peripheral surface with the interposition of a polyimide resin sheet to prepare a roll stamper of 31 cm in diameter and 45 cm in width. Next, the same procedure as in Example 1 was used except that this roll stamper was used, to prepare a molding equipment suitable for a substrate sheet for optical cards.

Next, a substrate sheet for optical cards having a thickness of 0.4 mm was preliminarily molded by the use of this equipment, and correlation of gap temperatures of the substrate sheet, the transfer precision of a preformat to the substrate sheet and the birefringence of the substrate sheet was observed.

As a thermoplastic resin, a polycarbonate (trade name L-1250, made by Teijin Chemical Limited) containing 0.05 wt. % of pentaerythritol tetrastearate as a releasing agent was used in the molding step, and a die temperature was set to 300° C. and a surface temperature of the roll stamper 106 was set to 130° C. As initial molding conditions, a feed rate of the substrate sheet was set to 3.5 m/min, and a feed rate of the resin to the gap was set to 21.2 kg/hr. The molding conditions were controlled every 30 minutes to change, between 1° and 15° C., an amplitude of temperature change of the gap temperatures of the substrate sheet during one rotation of the roll stamper 106. In this example, the size of the gap was made controllable between 0.54 mm and 0.58 mm, and a molding velocity was made controllable between 3.2 m/min and 3.8 m/min. Furthermore, an extrusion rate of the resin was made controllable between 20 kg/hr and 22 kg/hr. As a result, when the amplitude was in the range of from 2° to 10° C., the transfer precision of the preformat pattern was 99% or more and the birefringence was about 6 nm, and thus the substrate sheet for optical cards which was extremely excellent in quality and which substantially free from scatter could be obtained.

Here, an amplitude range of from 3° to 9° C. was input as a set value to a setting section 401 in a control means 112, and the substrate sheet having a thickness of 0.4 mm for optical cards was molded for 5 hours, while the molding conditions were controlled so that the amplitude of the gap temperatures of the substrate sheet during one rotation of the roll stamper 106 might be always present in the range of the set values.

For the thus obtained substrate sheet for optical cards, thickness, the transfer precision of the preformat pattern and the birefringence were measured in the same manner as in Example 1.

As a result, the thickness of the substrate sheet was 0.36 to 0.44 mm which was in the allowable range determined by standards, and the transfer precision was 99% or more. In addition, the birefringence was 6 nm or less. Thus, the substrate for optical cards having an extremely high quality could be obtained.

Comparative Example 3

The same procedure as in Example 2 was repeated except that a set value was 0° C., to prepare a substrate sheet for optical cards.

As a result, the thickness of the substrate sheet was in standards and a transfer precision was also good, 99% or more, but portions having birefringence values more than 30 nm were unevenly present. In consequence, the product was defective as a substrate sheet for optical cards.

Comparative Example 4

The same procedure as in Example 2 was repeated except that molding conditions were not controlled, to prepare a substrate sheet for optical cards.

As a result, the thickness of the substrate sheet was within standards, but a transfer precision was below 95% and a birefringence was in excess of 20 nm.

Example 3

Preliminary molding was carried out by the use of an equipment prepared in Example 2 and an amorphous polyolefin (trade name Zeonex 250; Nippon Zeon Co., Ltd.) as a thermoplastic resin. A die temperature was set to 320° C. and a surface temperature of the roll stamper 106 was set to 135° C. As initial molding conditions, a feed rate of the substrate sheet was set to 4.0 m/min, and a feed rate of the resin to the gap was set to 24.0 kg/hr.

The molding conditions were controlled every 30 minutes to change, between 1° and 15° C., an amplitude of temperature change of the gap temperatures of the substrate sheet during one rotation of the roll stamper 106. In this example, the size of the gap was made controllable between 0.54 mm and 0.58 mm, and a molding velocity was made controllable between 3.8 m/min and 4.2 m/min. Furthermore, an extrusion rate of the resin was made controllable between 23 k/hr and 25 k/hr.

As a result, when the amplitude was in the range of from 3° to 15° C., the transfer precision of the preformat pattern was 99% or more and the birefringence was 6 nm, and thus the substrate sheet for optical cards which was extremely excellent in quality and which was substantially free from scatter could be obtained.

Here, an amplitude range of from 4° to 10° C. was input as a set value to a setting section 401 in a control means 112, and the substrate sheet having a thickness of 0.4 mm for optical cards was molded for 5 hours, while the molding conditions were controlled so that the amplitude of the gap temperatures of the substrate sheet during one rotation of the roll stamper 106 might be always present in the range of the set values.

For the thus obtained substrate sheet for optical cards, thickness, the transfer precision of the preformat pattern and the birefringence were measured in the same manner as in Example 1.

As a result, the thickness of the substrate sheet was 0.36 to 0.44 mm which was in the allowable range determined by standards, and the transfer precision was 99% or more. In addition, the birefringence was 6 nm or less. Thus, the substrate for optical cards having an extremely high quality could be obtained.

Comparative Example 5

The same procedure as in Example 3 was repeated except that a set value was 0° C., to prepare a substrate sheet for optical cards.

As a result, the thickness of the substrate sheet was in standards and a transfer precision was also good, 99% or more, but portions having birefringences more than 30 nm were unevenly present. Consequentlys, the product was defective as a substrate sheet for optical cards.

Comparative Example 6

The same procedure as in Example 3 was repeated except that molding conditions were not controlled, to prepare a substrate sheet for optical cards.

As a result, the thickness of the substrate sheet was within standards, but a transfer precision was below 95% and a birefringence was in excess of 20 nm.

What is claimed is:

1. A method for preparing a substrate sheet for an optical recording medium which comprises the steps:
   controlling a gap between a roll stamper having a preformat pattern on the peripheral surface thereof and a molding roll to regulate the temperature of said roll stamper and said molding roll;
   feeding in a thermoplastic resin heated to the regulated temperature to the gap from a means for extruding the thermoplastic resin disposed on the upstream side of the gap, while the roll stamper and the molding roll are rotated at a specified rotational frequency; and then
   molding the thermoplastic resin into a sheet by pressing the resin between the roll stamper and the molding roll to transfer the preformat pattern to the resin, wherein the molding is carried out under controlled molding conditions of at least a gap size between the roll stamper and the molding roll and a molding velocity and a feed rate of a resin to the gap, thereby regulating said molding conditions so that gap temperatures of the substrate sheet are measured at intervals as they periodically fluctuate in a specified amplitude so that the amplitude accords with a value of an amplitude corresponding to a desired transfer precision and birefringence value of the substrate sheet for the optical recording medium.

2. The method for molding a substrate sheet for an optical recording medium according to claim 1 wherein said molding conditions are a size of the gap between the roll stamper and the molding roll.

3. The method for molding a substrate sheet for an optical recording medium according to claim 1 wherein said molding conditions are a rotary speed of the roll stamper and the molding roll.

4. The method for molding a substrate sheet for an optical recording medium according to claim 1 wherein said molding conditions are a feed rate of the thermoplastic resin to the gap.

5. The method for molding a substrate sheet for an optical recording medium according to claim 1 wherein said thermoplastic resin is a polycarbonate.

6. The method for molding a substrate sheet for an optical recording medium according to claim 1 wherein as said roll stamper, there is used a roll stamper in which the preformat pattern is directly formed on the peripheral surface of a roll base.

7. The method for molding a substrate sheet for an optical recording medium according to claim 1 wherein as said roll stamper, there is used a roll stamper in which a stamper is fixedly wound around the peripheral surface of a roll base.

8. The method for molding a substrate sheet for an optical recording medium according to claim 1 wherein as said roll stamper, there is used a roll stamper in which a stamper is fixedly wound around the peripheral surface of a roll base via a heat insulating layer.

9. The method for molding a substrate sheet for an optical recording medium according to claim 1 further comprising a step of determining the time of one cycle or more of the periodic fluctuation having a certain amplitude as indicated by the gap temperatures of the substrate sheet for the optical recording medium immediately after the substrate sheet has passed through the gap.

10. The method for molding a substrate sheet for an optical recording medium according to claim 9 wherein said time is the time required for one rotation of the roll stamper.

11. The method for molding a substrate sheet for an optical recording medium according to claim 1 wherein said optical medium is an optical card.

12. A method for molding a substrate sheet for an optical recording medium which comprises the steps of:
   controlling a gap between a roll stamper having a preformat pattern on the peripheral surface thereof and a molding roll to regulate the temperature of said molding roll and said roll stamper;
   feeding a thermoplastic resin heated to the regulated temperature to the gap from a means for extruding the thermoplastic resin disposed on the upstream side of the gap, while the roll stamper and the molding roll are rotated at a specified rotational frequency;

molding the thermoplastic resin into a sheet by pressing the resin between the roll stamper and the molding roll to transfer the preformat pattern to the resin;

a step of continuously measuring temperatures of the substrate sheet immediately after the passage of the gap;

a step of calculating an amplitude of the fluctuation of the measured values of the temperatures in a specified time;

and a step of controlling molding conditions of at least a gap size between a roll stamper and a molding roll, a molding velocity and a feed rate of a resin to the gap so that the amplitude may accord with a value of an amplitude corresponding to a desired transfer precision and a birefringence of the substrate sheet for the optical recording medium.

13. The method for molding a substrate sheet for an optical recording medium according to claim 12 wherein said molding conditions to be controlled are a size of the gap between the roll stamper and the molding roll.

14. The method for molding a substrate sheet for an optical recording medium according to claim 12 wherein said molding conditions to be controlled are a rotary speed of the roll stamper and the molding roll.

15. The method for molding a substrate sheet for an optical recording medium according to claim 12 wherein said molding conditions to be controlled are a feed rate of the thermoplastic resin to the gap.

16. The method for molding a substrate sheet for an optical recording medium according to claim 12 wherein said thermoplastic resin is a polycarbonate.

17. The method for molding a substrate sheet for an optical recording medium according to claim 12 wherein as said roll stamper, there is used a roll stamper in which the preformat pattern is directly formed on the peripheral surface of a roll base.

18. The method for molding a substrate sheet for an optical recording medium according to claim 12 wherein as said roll stamper, there is used a roll stamper in which a stamper is fixedly wound around the peripheral surface of a roll base.

19. The method for molding a substrate sheet for an optical recording medium according to claim 12 wherein as said roll stamper, there is used a roll stamper in which a stamper is fixedly wound around the peripheral surface of a roll base via a heat insulating layer.

20. The method for molding a substrate sheet for an optical recording medium according to claim 12 wherein said predetermined time is a time of one cycle or more of the periodic fluctuation having a certain amplitude which is indicated by the gap temperatures of the substrate sheet for the optical recording medium immediately after the substrate sheet has passed through the gap.

21. The method for molding a substrate sheet for an optical recording medium according to claim 20 wherein said predetermined time is a time required for one rotation of the roll stamper.

22. The method for molding a substrate sheet for an optical recording medium according to claim 12 wherein said optical medium is an optical card.

23. An apparatus for preparing a substrate sheet for an optical recording medium which comprises a means for extruding a thermoplastic resin; a roll stamper which has a preformat pattern on the peripheral surface thereof and which is controllable to have a regulated temperature and rotatable at a specified rotational frequency; and a molding roll for pressing the extruded resin together with the roll stamper to transfer the preformat pattern on the surface of the roll stamper to the resin and to mold the substrate sheet for the optical recording medium, the molding roll being disposed so as to confront the roll stamper with a regulated gap between the same and the roll stamper, being controllable to have a regulated surface temperature, and being rotatable at a specified rotational frequency; wherein said apparatus is provided with a measuring means capable of continuously measuring temperatures of the substrate sheet immediately after the substrate sheet has passed through the gap, and a control means having the following sections:

a calculating section for calculating an amplitude of the fluctuation of measured values of the temperatures in a predetermined time, a setting section for previously setting an amplitude value corresponding to a desired transfer precision and birefringence of the substrate sheet for the optical recording medium, a comparing section for comparing the amplitude obtained in the calculating section with the value set in the setting section to calculate a deviation, and a controlling section for controlling molding conditions in accordance with the degree of the deviation obtained in the comparing section so as to eliminate the deviation.

24. The apparatus for preparing a substrate sheet for an optical recording medium according to claim 23 wherein said apparatus is provided with a means for measuring said time of one cycle or more of the periodic fluctuation having a certain amplitude which is indicated by the gap temperatures of the substrate sheet for the optical recording medium immediately after the substrate sheet has passed through the gap.

25. The apparatus for preparing a substrate sheet for an optical recording medium according to claim 24 comprising means for measuring a time required for one rotation of the roll stamper.

* * * * *

UNITED STATES PATENT AND TRADEMARK OFFICE
CERTIFICATE OF CORRECTION

PATENT NO. : 5,433,897

DATED : July 18, 1995

INVENTOR : OSAMU KANOME, ET AL.

It is certified that errors appear in the above-identified patent and that said Letters Patent is hereby corrected as shown below:

COLUMN 2

Line 2, "permit" should read --permits--.

COLUMN 3

Line 41, "sections" should read --sections:--.

COLUMN 4

Line 3, "an unintended" should read --a random--.

COLUMN 11

Line 64, "TeiJin" should read --Teijin--.

COLUMN 12

Line 17, "which" should be deleted.

Line 34, "$\pm 1°$ C.")" should read --+1°C.")--.

COLUMN 13

Line 31, "in" should read --within--.

COLUMN 14

Line 45, "in" should read --within--.

UNITED STATES PATENT AND TRADEMARK OFFICE
CERTIFICATE OF CORRECTION

PATENT NO. : 5,433,897

DATED : July 18, 1995

INVENTOR : OSAMU KANOME, ET AL.

It is certified that errors appear in the above-identified patent and that said Letters Patent is hereby corrected as shown below:

COLUMN 15

Line 42, "Consequentlys," should read --Consequently,--.

COLUMN 16

Line 52, "time" (1st occurrence) should read --determined time-- and, "the" (1st occurrence) should read --a--.

Signed and Sealed this

Fourteenth Day of November, 1995

Attest:

BRUCE LEHMAN

Attesting Officer

Commissioner of Patents and Trademarks